United States Patent [19]

Hattori

[11] Patent Number: 5,229,941
[45] Date of Patent: Jul. 20, 1993

[54] AUTONOMOUS VEHICLE AUTOMATICALLY RUNNING ON ROUTE AND ITS METHOD

[75] Inventor: Akira Hattori, Kanagawa, Japan

[73] Assignee: Nissan Motor Company, Limtied, Japan

[21] Appl. No.: 337,707

[22] Filed: Apr. 13, 1989

[30] Foreign Application Priority Data

Apr. 14, 1988 [JP] Japan .............................. 63-50346[U]
Apr. 14, 1988 [JP] Japan .............................. 63-50347[U]

[51] Int. Cl.⁵ .......................................... G06F 15/50
[52] U.S. Cl. ................................ 364/424.02; 318/587; 180/167; 358/103
[58] Field of Search ...................... 364/424.02, 424.01, 364/460, 444, 449; 358/103; 340/995, 990, 988; 180/167-169; 318/587

[56] References Cited

U.S. PATENT DOCUMENTS

| | | | |
|---|---|---|---|
| 4,278,142 | 7/1981 | Kono .............................. | 364/424.02 |
| 4,528,563 | 7/1985 | Takeuchi . | |
| 4,570,227 | 2/1986 | Tachi et al. ........................ | 364/444 |
| 4,593,239 | 6/1986 | Yamamoto ........................ | 318/587 |
| 4,602,336 | 7/1986 | Brown .............................. | 364/460 |
| 4,630,226 | 12/1986 | Tanaka . | |
| 4,632,543 | 12/1986 | Endo . | |
| 4,652,803 | 3/1987 | Kamejima et al. ............ | 364/424.02 |
| 4,733,356 | 3/1988 | Haeussermann et al. ...... | 364/424.02 |
| 4,779,203 | 10/1988 | McClure et al. ................ | 364/424.02 |
| 4,782,447 | 11/1988 | Ueno et al. ..................... | 364/424.02 |
| 4,796,189 | 1/1989 | Nakayama et al. ............. | 364/449 |
| 4,817,000 | 3/1989 | Eberhardt ....................... | 364/424.02 |
| 4,819,169 | 4/1989 | Saitoh et al. . | |
| 4,829,442 | 5/1989 | Kadonoff et al. ............... | 364/424.02 |
| 4,855,822 | 8/1989 | Narendra et al. ............... | 364/424.02 |
| 4,862,047 | 8/1989 | Suzuki et al. ................... | 364/424.01 |
| 4,926,336 | 5/1990 | Yamada .......................... | 364/444 |

FOREIGN PATENT DOCUMENTS 3003287 8/1980 Fed. Rep. of Germany .
3135117 4/1982 Fed. Rep. of Germany .

OTHER PUBLICATIONS

A Guidance System For A Vehicle Which Has To Follow A Memorized Path, M. Julliere, L. Marce and H. Perrichot, L.A.T.E.A., Institut National des Sciences Appliquees, pp. 211-221.
An Experimental System For Automatic Guidance Of Roboted Vehicle Following The Route Stored In Memory, T. Tsumura, N. Fujiwara, T. Shirakawa and M. Hashimoto, pp. 187-194.

*Primary Examiner*—Gary Chin
*Attorney, Agent, or Firm*—Lowe, Price, LeBlanc & Becker

[57] ABSTRACT

An autonomous vehicle autonomously running on a route of travel and its method are disclosed in which data on a plurality of target points and on a plurality of paths, the target points and paths defining start and end points of road segments which are the respective paths into which the route of travel is divided are stored into a data storage block, a shape of each road segment is determined on the basis of the stored data in the data storage block, a target running state is set on the basis of the determined shape of each road segment, and a run control of the vehicle is carried out on the basis of the set running state. In addition, a new target point on one of the paths is set which provides a shortest distance from a new point to the corresponding path and data on the new target point is provided which includes the data on the running state at the new target point so that a start point and/or a final target point at which the vehicle is finally to reach can arbitrarily set on the route of travel.

16 Claims, 15 Drawing Sheets

FIG.2

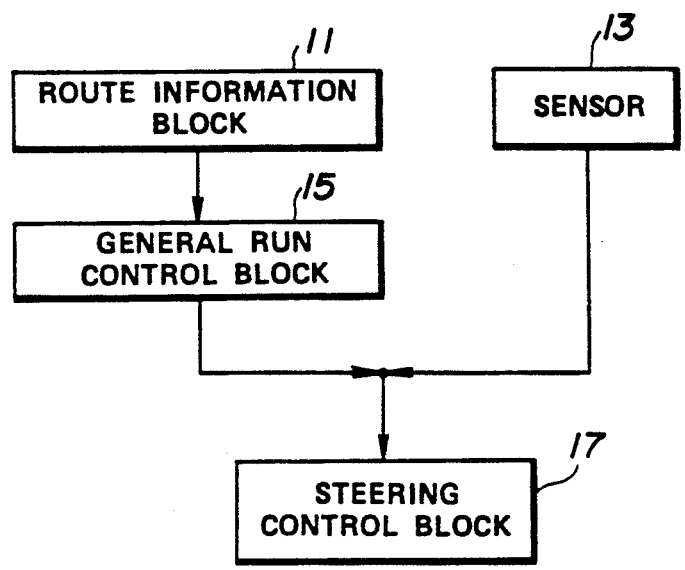

FIG.3(A)

| | |
|---|---|
| NODE NAME | (CHAR) |
| x COORDINATE (m) | (FLOAT) |
| y COORDINATE (m) | (FLOAT) |

FIG.3(B)

| | |
|---|---|
| START POINT NODE | (CHAR) |
| END POINT NODE | (CHAR) |
| RADIUS OF CURVATURE (R) | (FLOAT) |
| PATH LENGTH (D) | (FLOAT) |
| TANGENTIAL DIRECTION ($\theta s$) AT START POINT NODE | (FLOAT) |
| TANGENTIAL DIRECTION ($\theta e$) AT END POINT NODE | (FLOAT) |
| ROAD WIDTH (W) | (INT) |
| NUMBER OF TRAFFIC LANES | (INT) |
| SHAPE OF START POINT NODE | (CHAR) |
| SHAPE OF END POINT NODE | (CHAR) |
| ONE-WAY TRAFFIC/TWO-WAY TRAFFIC | (CHAR) |

FIG.6(A)

$j = 1 \sim o_{max}$

| FRONT TARGET POINT COMMAND NAME | n |
| --- | --- |
| LANE DISTANCE (m) | d |
| TARGET VEHICLE SPEED (Km/h) | Vpr |
| TARGET STEERING ANGLE (deg.) | Spr |
| SELECTION OF WHITE LINE PICKED UP BY CAMERA | $Q_0$ |
| TARGET DISTANCE FROM WHITE LINE | $Q_1$ |
| LOCAL TARGET VEHICLE POSTURE (deg.) | $Q_2$ |

FIG.6(B)

$i = 0 \sim o_{max}$

| GLOBAL TARGET POSITION | xg, yg, $\theta$ |
| --- | --- |
| LOCAL TARGET POSITION | xl, xr, $\theta$ d |
| TARGET VEHICLE SPEED (Km/h) | Vpo |
| TARGET STEERING ANGLE (deg.) | Spo |

FIG.7

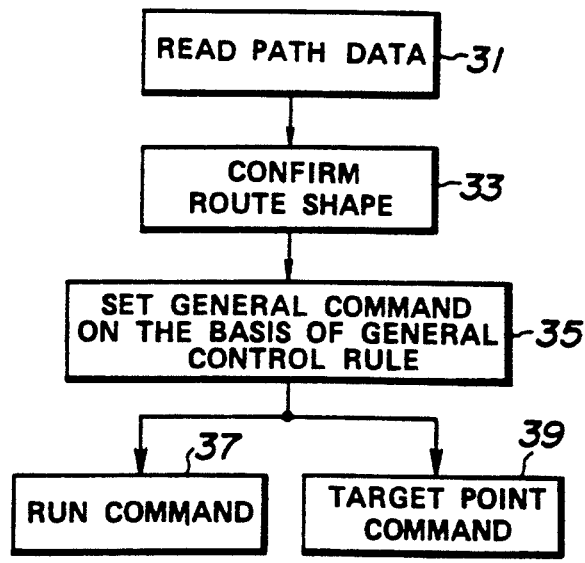

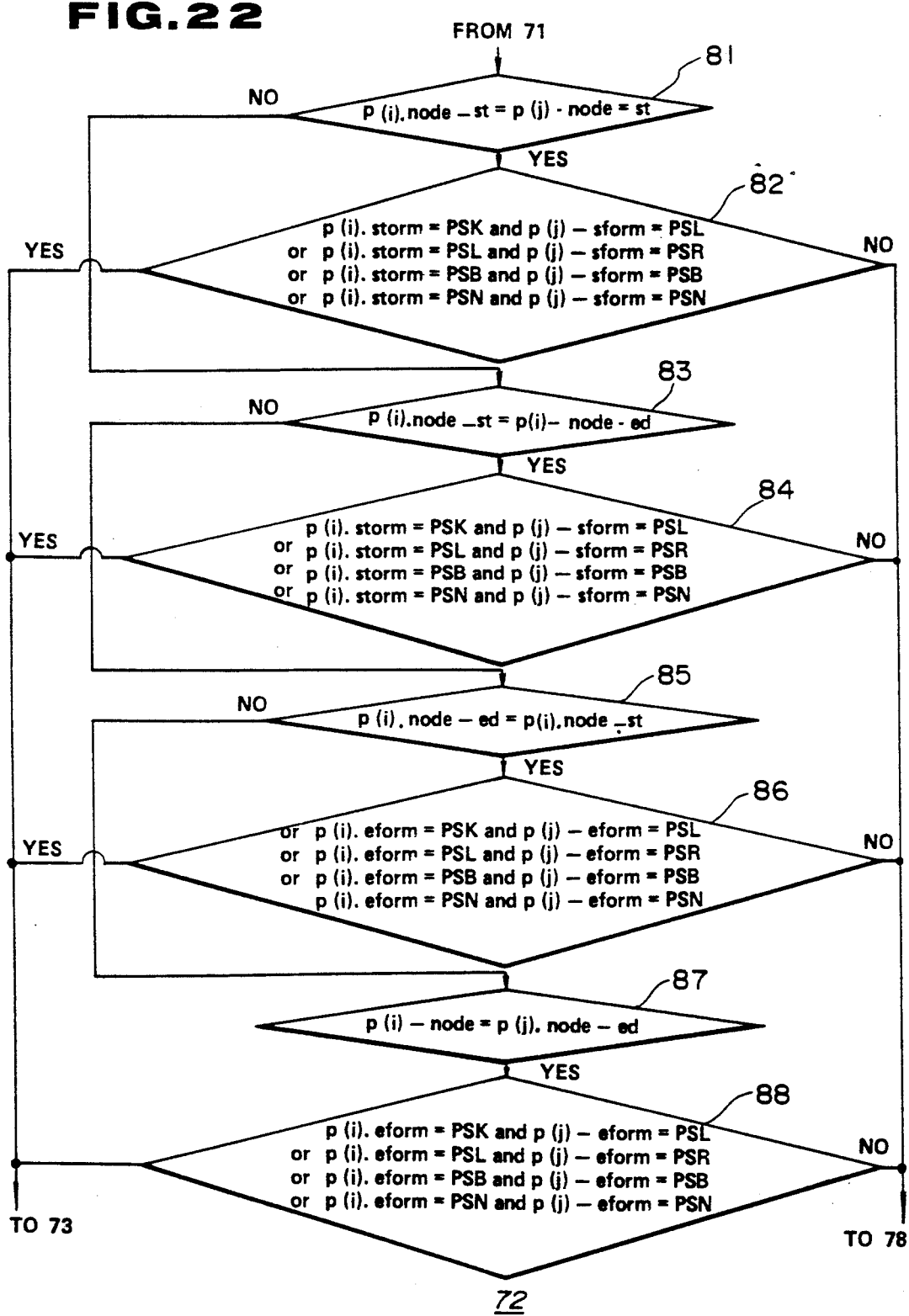

AUTONOMOUS VEHICLE AUTOMATICALLY RUNNING ON ROUTE AND ITS METHOD

BACKGROUND OF THE INVENTION

1. Field of the Invention

The present invention relates to an autonomous vehicle which runs autonomously on a set route of travel and a method for autonomously running the autonomous vehicle, and particularly relates to the autonomous vehicle and operation thereof which achieve to run properly and smoothly on the set route according a shape of the route of travel to be passed to reach a final destination as if a vehicle driver were driving a usual automotive vehicle.

2. Background of the art

A Japanese Patent Application First Publication sho 62-162113 published on Jul. 18, 1987 exemplifies one of various kinds of unmanned vehicles which can automatically run without a driver using a photographing device on the unmanned vehicle.

However, in the above-identified Patent Application Publication, a present point at which the unmanned vehicle is placed and a destination cannot be arbitrarily set.

In addition, in another previously proposed unmanned vehicle, a guiding cable is extended along a preset route of travel and the unmanned vehicle is guided along the preset route of travel. When a predetermined signal is transmitted to the guiding cable, a pick up coil installed on the vehicle detects the presence of the predetermined signal on the cable and the vehicle runs on the route of travel, determining a deviation from the preset route of travel.

Furthermore, in another previously proposed unmanned vehicle, an optical reflecting tape made of, e.g., an aluminium tape or polyvinyl tape is adhered to a surface of the route of travel in place of the guiding cable and a projector and light receiver are installed on the unmanned vehicle. Then, a light is projected from the projector and a light reflected on the optical reflecting tape is captured by the receiver. Thus, the unmanned vehicle is guided along the reflecting tape.

However, in a method of guiding the unmanned vehicle along the guiding cable, a large scale of installations of the cable, unmanned vehicles, and route of travel are required and extensions and modifications of the installations become difficult.

In a method of using the optical reflecting tape, a light reflectivity of the tape becomes reduced due to dust and dirt deposited and adhered onto the surface of the tape from the surface of the route of travel. Therefore, a troublesome maintenance operation of cleaning the surfaces of the route of travel and tape is required.

In addition, since the unmanned vehicle is required to run along the cable or tape, an abrupt steering operation is executed when the vehicle runs on a curved line of the route and smooth steering operation is difficult.

SUMMARY OF THE INVENTION

It is therefore an object of the present invention to provide an autonomous vehicle for automatically running on a route of travel, in which the vehicle can run smoothly according to a shape of the route of travel.

The above-described object can be achieved by an autonomous vehicle, comprising: a) first means for storing information on each of predetermined road segment, a route of travel on which the vehicle is to pass to reach a destination being divided into the plurality of predetermined road segments; b) second means for determining a shape for each road segment on the basis of the stored information of the first means; c) third means for setting a target running state of the vehicle for each road segment on the basis of the determined shape; and d) fourth means for controlling the run of the vehicle on the basis of the set running state.

The above-described object can also be achieved by an apparatus in which a plurality of target points are set on particular positions of a particular route of travel, comprising: a) first means for providing and outputting a first information related to a route of travel, the first information including a second information on the respective target points and a third information on each path defining a segment of the route of travel from one of the target points to the subsequent one of the target points; b) second means for controlling a run of an unmanned vehicle on the basis of the first information; c) third means for setting a new target point on one of the paths, the new target point being defined as a shortest distance point on the related path which provides a shortest distance from a new point on a route of travel except the particular route of travel; and d) fourth means for providing and outputting a fourth information on the new target point as the first information.

The above-described object can be achieved by providing a method for autonomously running an autonomous vehicle, comprising the steps of: a) storing information on each of predetermined road segment, a route of travel on which the vehicle is to pass to reach a destination being divided into the plurality of predetermined road segments; b) determining a shape for each road segment on the basis of the stored information in the step a); c) setting a target running state of the vehicle for each road segment on the basis of the determined shape; and d) controlling the run of the vehicle on the basis of the set running state.

BRIEF DESCRIPTION OF THE DRAWINGS

FIG. 2 is a functional block diagram of a preferred embodiment of an essential part in the present invention.

FIGS. 3(A) and 3(B) are explanatory views of information on a route of travel on which the autonomous vehicle according to the present invention runs.

FIGS. 6(A) and 6(B) are explanatory views of the run command and the target point command.

FIG. 7 is an operational flowchart of a control operation shown in FIG. 2.

FIG. 22 is a processing flowchart on a node determination executed in the flowchart shown in FIG. 20.

DETAILED DESCRIPTION OF THE PREFERRED EMBODIMENTS

Reference will hereinafter be made to the drawings in order to facilitate understanding of the present invention.

Figure 1:
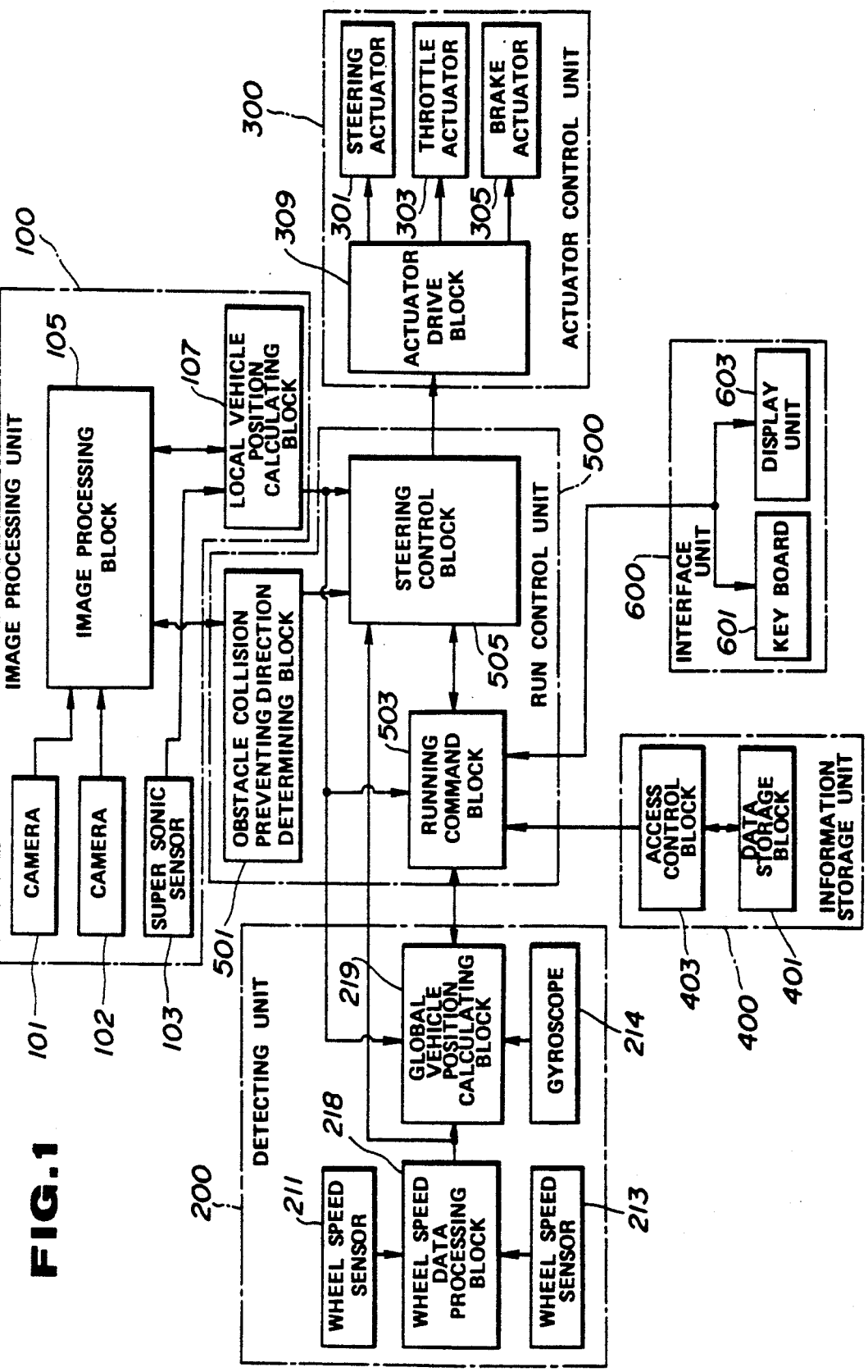
FIG. 1 is a circuit block diagram of a construction of an autonomous vehicle for automatically running on a route of travel.

FIG. 1 shows a whole construction of an autonomous vehicle to which the present invention is applicable.

The autonomous vehicle includes a camera and various sensors. The autonomous vehicle properly determines a road situation in a forward direction and runs autonomously on a route of travel on the basis of various kinds of information:

The autonomous vehicle includes: a) an image processing unit 100 which photographs an image present in a forward direction of the vehicle and processes the image, b) a detecting unit 200 which calculates a position of the vehicle itself in an absolute coordinate system on the basis of the detected information from a wheel speed sensor, gyroscope, and so on, c) an actuator/actuator control unit having a steering, accelerator, brake system, and winker, and so on and actuators for the respective systems of the steering, brake system, and winker, respectively, and controlling such actuators, d) an information storage 400 in which is stored a map information to a destination and information on a route of travel, e) a run control unit 500 which controls the actuator control unit 300 in order to run the vehicle toward a final target point on the basis of information derived from each unit, and f) an interface unit 600 which inputs information on a destination, i.e., a plurality of target points set on the route of travel from the run control unit 500 and displays the image derived from the image processing unit 100 and other information.

The image information processing unit 100 is provided with two sets of cameras 101, 102. The cameras 101, 102 are installed at left and right ends of a front portion of the vehicle in order to photgraph a stereo image, i.e., a stereo perspective image in the forward direction of the vehicle. The perspective image photographed by the two sets of cameras 101, 102 are supplied and processed by means of an image processing block 105 in which an image processing microcomputer is incorporated. In addition, the perspective image is transformed into a plane image by means of the image processing block 105 (in a reverse perspective image transform). The image processing block 105 detects, e.g., a pair of white lines (guide lines) described on the route, a roadside band, center line, and so on and measures their positions from the vehicle.

In details, a relative positional relationship between a road and vehicle through the detection of white lines on the road, i.e., a distance from the vehicle to a left side (right side) white line, a distance from the vehicle to a left side (right side) white line, an angle formed between the forward direction of the vehicle and the road, and so on are calculated and a curvature and direction of a curved road in a mid way of road are derived. In addition, a distance from the vehicle to an intersection is derived by measuring a cut point of the white line in front of the intersection.

In addition, the image processing unit 100 includes a supersonic sensor 103 and laser radar, etc., for detecting an obstacle present in a forward direction of the vehicle and side portion of the vehicle, for example, a preceding vehicle, a guide rail, and so on and for transmitting such detected information to a local vehicle position calculating block 107.

The structures of the supersonic sensor and laser radar are exemplified by U.S. Pat. Nos. 4,528,563 issued on Jul. 9, 1985, 4,632,543 issued on Dec. 30, 1986, and 4,630,226 issued on Dec. 16, 1986, the disclosures of which are hereby incorporated by reference.

The distances and angles information derived by the image processing block 105 are supplied to the local vehicle position calculating block 107 in which a positional relationship between the running route and vehicle itself, i.e., a local vehicle position is calculated. The sturcture of the local vehicle position calculating block 107 may be exemplified by a U.S. Pat. No. 4,819,169 issued on Apr. 4, 1989, the disclosure of which is hereby incorporated by reference.

It is noted that the cameras may be provided in a set of three units to take a wide viewing angle and thereby the above-described parameters of distances and angles can precisely be derived from images in a right front position, left front portion, and center front portion.

The detecting unit 200 includes a pair of wheel speed sensors 211, 213 installed on a rear left wheel and on a right rear wheel, wheel speed data processing block 218 for receiving the output signals from the both wheel speed sensors 211, 213, and global vehicle position calculating block 219.

The wheel speed sensors 211, 213 detect rotations of the rear tire wheels and generate several thousands of pulses per wheel rotation for each wheel. Hence, if a difference between the numbers of pulses generated for each wheel is calculated, it indicates a difference of the run distance and thus the difference provides a basis of determining whether the vehicle is running along a curved road.

In addition, the running distance of both wheels indicates a running distance by which the vehicle has run. Therefore, a displacement of the vehicle can be calculated on the basis of such series of information. Specifically, a vehicular relative positional information with a posture of the vehicle, i.e., position of the vehicle at some time, i.e., information of a vehicle position and direction of $\theta$ in an X, Y coordinate system can be derived. If the vehicular position before running is already known, the present position of the vehicle during the run can always be detected by processing sequentially the wheel speeds. It is noted that since an error of the position is accumulated, the measurement errors become large as the running distance becomes increased. Thus, a gyroscope 214 is installed so that a vehicular position in an absolute coordinate system can be measured with high accuracy. The position of the vehicle derived in the way described above is a global position of the vehicle itself.

The actuator control unit 300 includes various actuators required to run the unmanned vehicle autonomously, i.e., a steering actuator 301 for actuating a steering wheel system, a throttle actuator corresponding to an accelerator member 303 of the usual vehicle, and a brake actuator 305 for actuating a brake mechanism. An actuator drive block 309 controls each of the actuators 301, 303, and 305 on the basis of a control signal derived from a run control unit 500. It is noted that although the above-described actuators may be used in a case where the vehicle has adopted an automatic transmission (AT) and runs only in the forward direction, operation actuators for a transmission clutch and shift lever are additionally needed in a case where the vehicle has adopted a manual transmission (MT) or control for a rearward direction is executed.

A steering control by means of the actuator control unit 300 is initiated in response to a right rotation command, left rotation command, or target steering angle control command derived from a run steering control block 505.

An information storage unit 400 includes a data storage block 401 which stores a map information on a destination, a map information to the destination, e.g., map information on positions of intersections (branching points) depending on the roads to the destination and map information on distances between the intersections and access control block 403 for controlling the access to the data storage block 401 from the run control unit 500.

The run control unit 500 shown in FIG. 1 determines properly the road information in the forward direction of the vehicle detected by the image processing unit 100 and detecting unit 200 and drives and controls the actuator control unit 300 to run the vehicle toward the destination inputted from an interface unit 600, referring to the information derived from the information storage unit 400.

The run control unit 500 includes an obstacle collision preventing direction determining block 501, a run command issuing block 503, and steering control block 505.

The obstacle collision preventing direction determining block 501 receives obstacle data from the image processing block 105 of the above-described image information processing unit 100 and determines a direction toward which the vehicle can avoid collision with the obstacle present in the forward direction on the basis of the obstacle data.

The running command block 503 receives the information from the information storage unit 400, the global vehicle position information from the global vehicle position calculating block 219 of the detecting unit 200, the local position information from the local vehicular position calculating block 107 of the image information processing unit 100, and destination information from the interface unit 600, and outputs control information on the running operations such as straight run, left and right turn, deceleration, acceleration, and stop.

The steering control block 505, on the basis of control information from the run command block 503, the local vehicular information including the distance, angle, and so on from the road end from the local vehicular position calculating block 107 of the image processing unit 100, information on the direction toward which the vehicle can avoid collision of the obstacle from the obstacle collision preventing direction determining block 502, and information on the vehicular posture (position) including the displacement of the vehicle from the wheel speed data processing block 218 of the detecting unit 200, supplies various control signals required to control the actuator control block 300, e.g., target vehicle speed, target steering angle, and so on to the actuator control block 300 to perform the steering operation control.

The interface unit 600 includes a keyboard 601 inputting information on a plurality of target points set in the route to the destination and display unit 603 displaying information on the route of travel toward the destination and various data on, e.g., the plurality of target points. A digitalizer may be used in place of the keyboard 601. The interface unit 600 may include a voice recognition device or voice synthesizer as a man-machine interface.

Next, a first preferred embodiment of an essential part of the autonomous vehicle according to the present invention will be described with a chief reference to FIG. 2.

A route information block 11 constituted by the data storage block 401 shown in FIG. 1 is provided with a storage in which a node information and path information are stored as the information on the run road on which the vehicle runs.

The node information is stored in a format shown, e.g., in FIG. 3 (A). A particular point on the running road is set as the node. The x coordinate and y coordinate on the particular point and node name are stored. A plurality of nodes described above are set on the route of travel and the above-described contents are stored for each node. In addition, the x coordinate and y coordinate are set in the absolute coordinate system.

Figure 4:
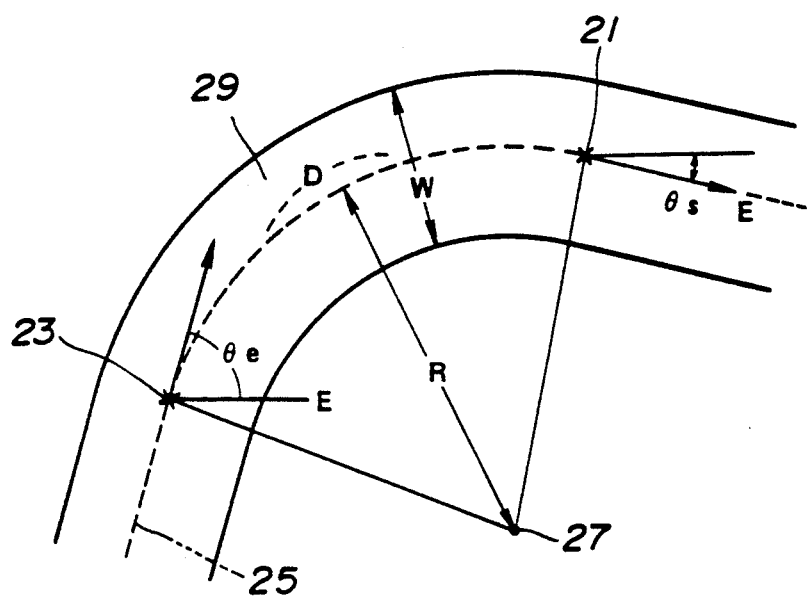
FIG. 4 is an explanatory view of a path information.

The path information is stored in the format shown in FIG. 3 (B) and FIG. 4. As shown in FIG. 4, a locus from a start node 21 on the running road to an end node 23, i.e., the next node is set as the path.

The path information includes a distance from a road center line 25 to a curve center 27, i.e., a radius of curvature R, a distance from the start node 21 to the end node 23, i.e., a path length D, an angle $\theta_s$ in a tangential direction at the start node 21, an angle $\theta_e$ in the tangential direction at the end node 23, a width W of the running road 29, the number of traffic lanes of the running road 23, and classification of whether the running road is a one-way traffic or two-way traffic.

The sensor 13 shown in FIG. 2 is formed of the cameras 101, 102 and supersonic sensor 103 to detect the so-called local vehicle position. The local vehicle position relates to a relative vehicle own position from a running road end, e.g., white line (guide line) or guide rail.

A general run control block 15 constituted by the run command block 503 is connected to the route information block 11 for outputting a run command PR (j) and target point command PR (i) on the basis of the node information (data) and path information (data).

Figure 5:
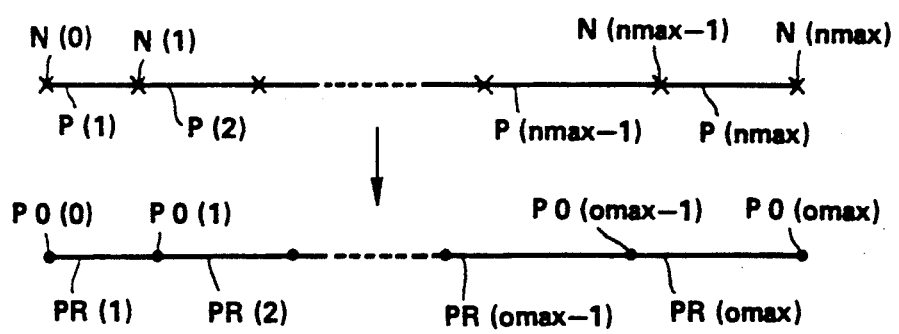
FIG. 5 is an axplanatory view of a run command and target point command.

That is to say, when the node data N(0), N(1), - - -, N(n max−1), and N(n max) and the path data PO (1), PO (2), - - -, P(N max−1), and P(n max) are inputted from the route information block 11, the target point commands PO(0), PO(1), - - -, PO(o max−1) and run commands PR(1), PR(2), - - -, PR(o max−1), and PR(o max) are sequentially outputted on the basis of the data described above derived from the route information block 11, as shown in FIG. 5. It is noted that these target commands PO(i) (i=0, 1, 2, - - -, n max) and run commands PR(j) (j=1, 2, ---, o max) are always outputted in couples wherein i=j.

The run commands PR(j) include items shown in FIG. 6 (A). Specifically, the run command PR(j) includes a name of the coupled target point command, i.e., a name of command n of a preceding target point with respect to the forward direction toward which the vehicle advances, a distance d of the road center line between the target points, the target vehicle speed $V_{pr}$ during the run of the vehicle, a target steering angle $S_{pr}$, a selection $Q_o$ of a white line to be picked up by one of the cameras during the run, a distance $Q_1$ to be maintained from the white line to the vehicle, and vehicle own position (posture) to be maintained during the run, i.e., the local target own posture $Q_2$.

The target point command PO(i) includes items as shown in FIG. 6(B).

Specifically, the target point command PO(i) includes various data, i.e., a position in the absolute coordinate system, i.e., the global target position ($X_s$, $Y_s$, $\theta$), local target position (x, l, $x_r$, $\theta_d$), target vehicle speed $V_{po}$, and target steering angle $S_{po}$.

The steering control block 17 constituted by the run steering control block 505 is connected to the sensor 13 and general running command block 15, respectively for executing the steering control on the basis of information on the local vehicle own position from the sensor 13 and the target point command PO(i) and run command PR(j) derived by the general running control block 15.

An operation of the first preferred embodiment will be described with reference to FIG. 7.

In a step 31, the general run control block 15 executes a route search (the details of the route search will be described in a second preferred embodiment with reference to FIG. 20) and inputs a path data from the route information block 11.

In a step 33, the general run control block 15 determines for each path data a shape of the route of travel, e.g., whether the route is a straight road, curved road, branched road (a letter T-shaped or inversed L-shaped intersection), or cross-shaped intersection (for the branched and intersected roads, refer to, e.g., FIG. 11) on the basis of the start node, end node, radius of curvature R, angle $\theta_s$ in the tangential direction at the end node, and an angle $\theta_e$ in the tangential direction at the end node from the path data.

In a step 35, the general run control block 15 determines a general run command based on a general run control rule according to the shape of the route determined in the step 33.

The general control rule is set as ten kinds of rules (Rule), as shown in FIGS. 8(A) to 8(J), according to the shape of the route. Rules 1 to 3 are applied to a case where the vehicle moves from the straight road to the straight road via the curved road. Rules 4 to 6 are applied to cases where the vehicle moves from the straight road to the straight road including the branched point. Rules 7 to 9 are applied to cases where the vehicle moves from the straight road to the straight road including the passage of the intersection(s). Rule 10 is applied to a case where the vehicle moves from the curved road to the curved road.

Next, each rule will be described with reference to FIGS. 8(A) to 8(J).

Figure 8A:
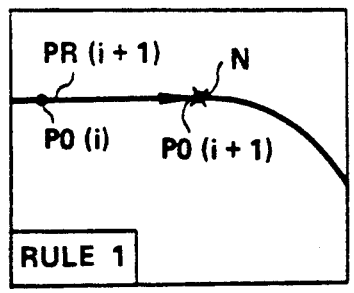
FIGS. 8(A) to 8(J) are explanatory views of control rules on the run.

The rule 1 is such that the target point command PO(i+1) is set on the same point as the node N, as shown in FIG. 8(A), at the point, the target vehicle speed $V_{PO}$ is set at the low speed, and a target steering angle $S_{PO}$ is set at a constant angle. Hence, the vehicle is once decelerated immediately before a point at which the vehicle enters the curved road and gradually steered.

Figure 8B:
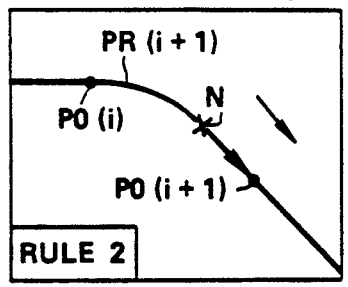

The rule 2 is such that the target point command PO(i+1) is set so as to be deviated forward at the point of the node N, at that deviated point, the target vehicle speed $V_{PO}$ is set at a high speed, and the target steering angle $S_{PO}$ is set to 0, as shown in FIG. 8(B). In addition, the running target vehicle speed $V_{pr}$ is set in the run command PR(i+1) to a low speed, the run target steering angle $S_{pr}$ is set to a constant angle, and a white line captured by the cameras is set as an outside white line, i.e., $Q_o$ is set as right or left. Hence, the vehicle is accelerated at a trailing portion of the curved road and simultaneously the steering angle is gradually returned to the original steering angle.

Figure 8C:
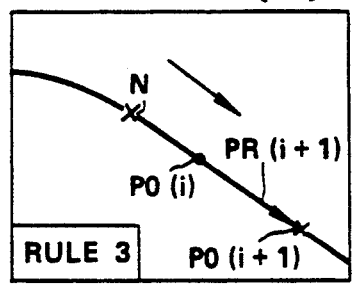

The rule 3 is such that, as shown in FIG. 8(C), the target command PO(i) is set in the forward direction with respect to the node N and accordingly the route distance d of the run command PR(i+1) is corrected.

Figure 8D:
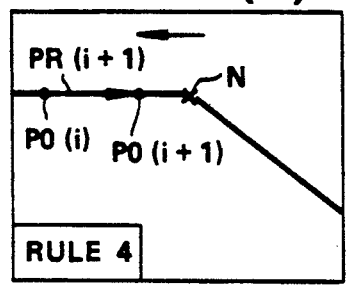

The rule 4 is such that, as shown in FIG. 8(D), the target point command PO(i+1) is set in front of the point of node N which is a branching point, the target vehicle speed $V_{po}$ in the target point command PO(i+1) is set at a low speed and its target steering angle is set to the constant angle. Hence, the vehicle is decelerated until the vehicle reaches an immediate point before the branching point and the vehicle is gradually steered.

Figure 8E:
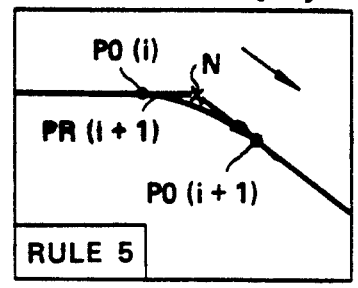

The rule 5 is such that, as shown in FIG. 8(E), the target point command PO (i+1) is set so as to be deviated forward with respect to the point of node n which is the branching point, the target vehicle speed $V_{po}$ in the target command PO(i+1) is set to a high speed, and the target vehicle speed $S_{po}$ is set to 0. In addition, the running target vehicle speed $V_{pr}$ of the run command PR (i+1) is set to a low speed, and the run target steering angle $S_{pr}$ is set to the constant angle. Hence, the vehicle is accelerated when the vehicle runs at a later half portion of the branching point, i.e., after passage of the vehicle through the branching point and the steering angle is gradually returned to the original point of angle.

Figure 8F:
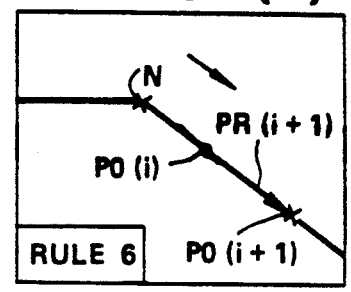

The rule 6 is such that, as shown in FIG. 8(F), together with the setting of the target point command PO(i) at a forward position with respect to the point of node N which is the branching point, the distance of route d of the run command PR(i+1) is corrected.

Figure 8G:
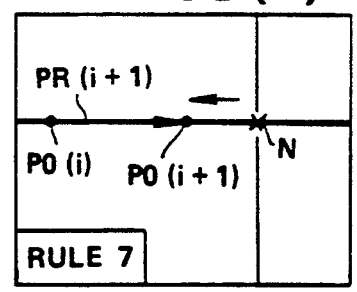

The rule 7 is such that, as shown in FIG. 8(G), the target point command PO(i+1) is set in front of the point of node N which is an intersection, the target vehicle speed $V_{po}$ of the target point command PO(i+1) is set to a low speed. Hence, the vehicle speed is decreased toward the low speed at a point immediately before the vehicle enters the intersection.

Figure 8H:
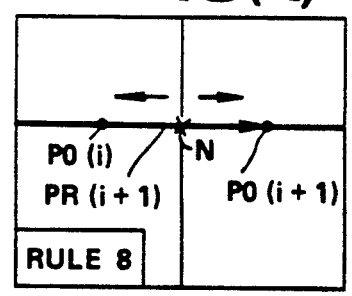

The rule 8 is such that, as shown in FIG. 8(H), the target point command PO(i+1) is set at a forward portion of the point of node N which is the intersection and the target vehicle speed $V_{po}$ of the target point command PO(i+1) is set at a high speed.

In addition, the run target vehicle speed $V_{pr}$ of the run command PR(i+1) is set at a low speed and the selection $Q_o$ of white line to be picked up by the cameras is set as nothing. Hence, since the information on the white line cannot be obtained at a position before and after the intersection, the vehicle passes through the intersection at the low speed and is accelerated after the passage of the intersection.

Figure 8I:
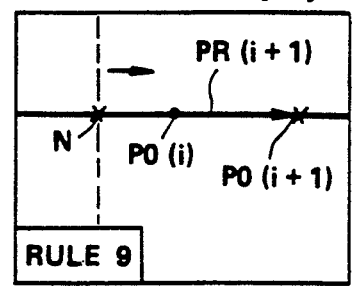
Figure 8J:
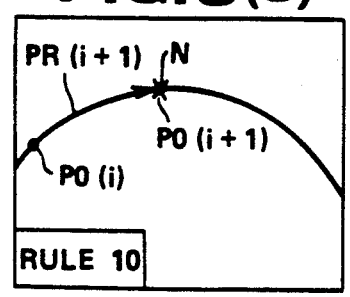

The rule 9 is such that, as shown in FIG. 8(I), the target point command PO(i) is set in front of a point of node N which is the intersection and accordingly the route distance d of the run command PR(i+1) is corrected. In addition, the selection of white line $Q_o$ of the run command PR(i+1) picked up by the cameras is set to an usual state, e.g., "left" or "right". Hence, after the vehicle has passed through the intersection, the information on the white line is collected and the vehicle is forwarded.

The rule 10 is such that, as shown in FIG. 8 (J), the target point command PO(i+1) is set at the same point as that of node N, at that point, the target vehicle speed $V_{po}$ is set to a low speed and the target steering angle $S_{po}$ is set to 0. In addition, the run target vehicle speed $V_{pr}$ of the run command PR(i+1) is set at a constant angle. Hence, the vehicle runs at the low speed along the curved road and simultaneously the steering angle is gradually returned to the original position when the vehicle has passes through a rear half portion of the curved road.

It is noted that, as shown in FIG. 7, in a step 37, the steering run control block 17 issues the run command in accordance with the settings of the general run command. In a step 39, the steering run control block 17 issues the target point commands in accordance with the settings of the general run commands.

Thus, the run control of the vehicle is executed in correspondence with the shapes of the route on the basis of the general control rules.

As described hereinabove, since, with the target point command PO(i) and run command PR(j) issued, the run control is executed on the basis of the information related to the target points included in these commands and information related to the target run state, the vehicle can run autonomously without use of special means such as the guiding cables and optical reflecting tapes.

A second preferred embodiment of the autonomous vehicle according to the present invention will be described below.

The construction of the second preferred embodiment is the same as shown in FIG. 1.

Figure 9:
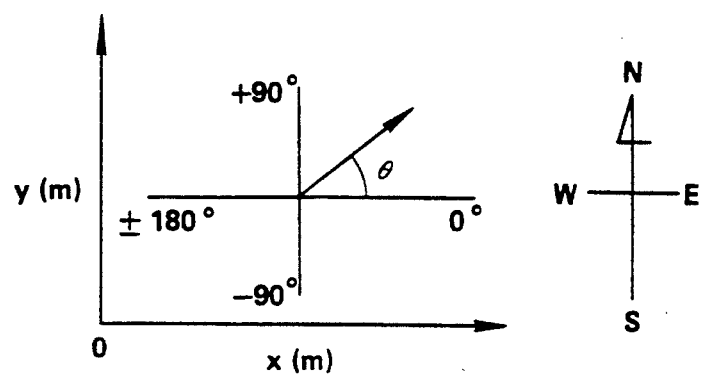
FIG. 9 is an explanatory view of a global coordinate on which a map data is set.

It is noted that, in the second preferred embodiment, in the data storage block 401, the map data to the destination is stored. The map data is set by means of global coordinates $(x_m, y_m)$ in the absolute coordinate system as shown in FIG. 9. That is to say, $x_m$ indicates positive in the East direction and $y_m$ indicates positive in the North direction, and origin O indicates a reference point in the South-Westernmost direction ($x \geq 0$, $y \geq 0$). In addition, a relative angle $\theta°$ in the global coordinates indicates 0 in the East direction, $+90°$ in the North direction, $-90°$ in the South direction, and $\pm 180°$ in the West direction. In addition, the data storage block 401 stores node information and path information as information on the running road.

The node information is stored in the format as shown in FIG. 3(A) and the path information is stored in the format shown in FIGS. 3(B) and 4.

Figures 10A, 10B:
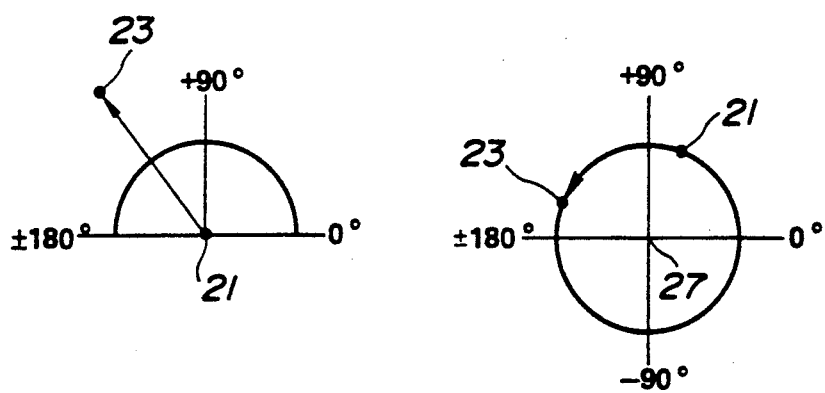
FIGS. 10(A) and 10(B) are explanatory views of an angular coordinate system on which a node is set.

It is noted that in a case where the route of travel indicates a straight road, a start node 21 is set on an origin of the angle coordinate system shown in FIG. 10(A). In a case where the running road is the curved road, a route of path from the start node 21 to the end node 23 is set in a counterclockwise direction in the angle coordinate system with the center of rotation 27 as the origin O as shown in FIG. 10(B).

Figure 11:
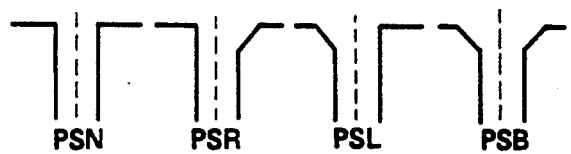
FIG. 11 is an explanatory view of a shape of each road end.

The shapes of the road ends in the start node and in the end node described above are set in such a way that, in the case where neither the right turn nor left turn with respect to the forward direction of the vehicle can be carried out, the shape is set as PSN shown in FIG. 11, in the case where the vehicle cannot turn only left but can turn right, the shape is set as PSR shown in FIG. 11, in the case where the vehicle cannot turn only right but can turn left, the shape is set as PSL shown in FIG. 11, in the case where the vehicle can turn both left and right, the shape is set as PSB shown in FIG. 11.

Figure 12:
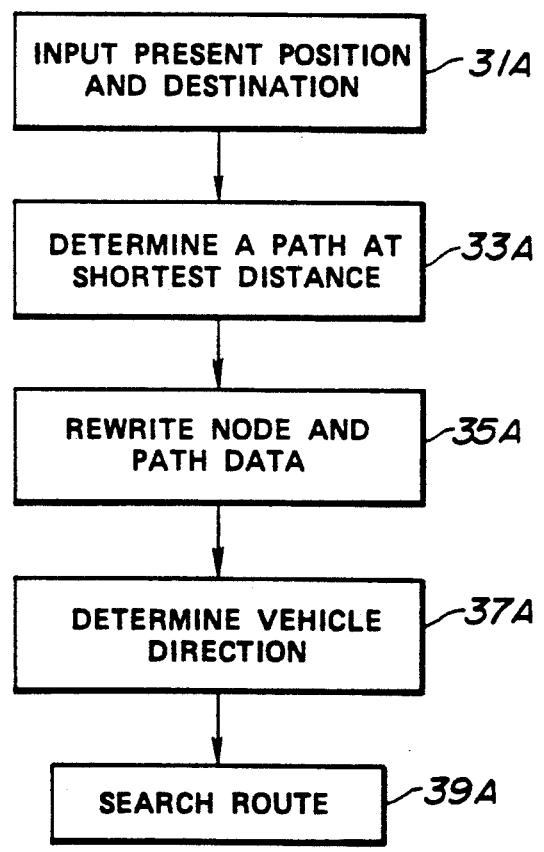
FIG. 12 is an operational flowchart of a control operation.

The run control unit 500 carries out the following series of operations shown in FIG. 12.

In a step 31A, data on the present point S ($x_s$, $y_s$, $\theta_s$) of the vehicle and final target point (destination) E ($x_e$, $y_e$, $\theta_e$) of the vehicle are inputted via the interface unit 600, wherein x,y is indicated with an origin position on the global coordinate system at which the vehicle is started to move as a center and the angle $\theta$ denotes the global vehicular posture in the forward direction of the vehicle, $-180$ (degrees) $\geq \theta \geq 180$ (degrees). The present positional point S and final target point E can arbitrarily be set at any place in the running road.

In a step 33A, a route present in the shortest distance from the present point S, i.e., the path is determined and a shortest distance point C is set on one of the paths.

A detailed control processing executed in the step 33A will be described below with reference to FIGS. 13 to 17.

Figure 13:
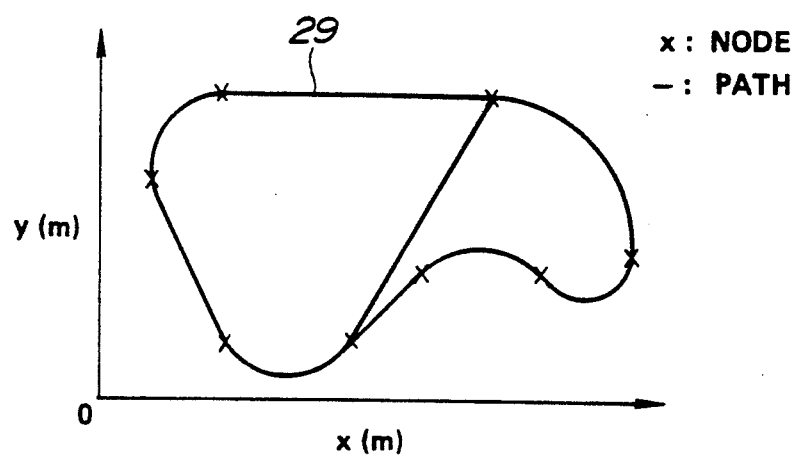
FIGS. 13 to 16 are explanatory views of setting of a most shortest distance point.

Suppose that a travel route 29 having a layout, in which straight road and curved road segments are mixed as shown in FIG. 13, is present in the running roads.

Figure 14:
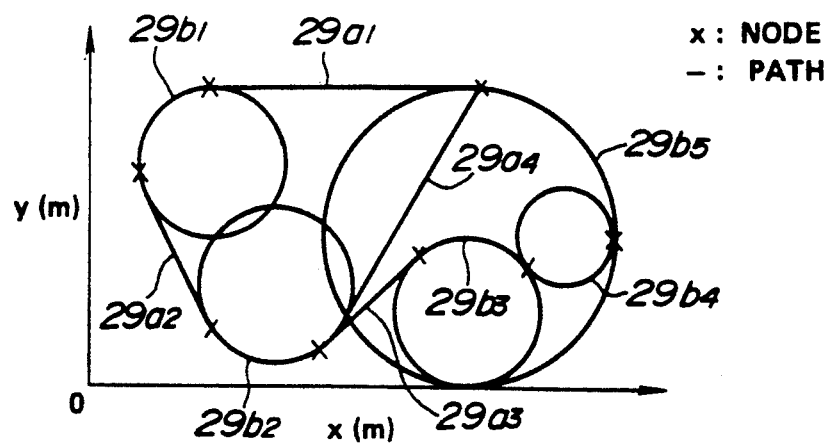

In this case, as shown in FIG. 14, the route 29 is divided into segments of straight roads $29_{a1}$, $29_{a2}$, $29_{a3}$, $29_{a4}$ and curved roads $29_{b1}$, $29_{b2}$, $29_{b3}$, $29_{b4}$, $29_{b5}$.

Next, the settings of the present point S and the shortest distance point on the above-described path by means of the run control unit 500, interface unit 600, and information storage unit 400 will be described below.

Figure 15:
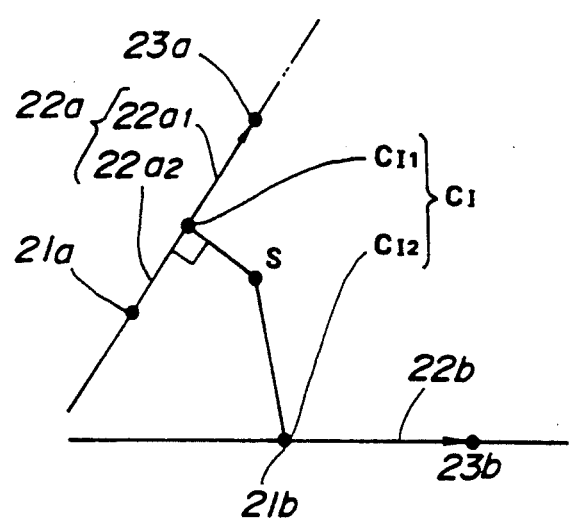

First, as shown in FIG. 15, when the route 29 is constituted by the straight road segments, a perpendicular line is drawn from the present point S to one of the paths $22_a$ and the intersection between the perpendicular and path $22_a$ is set as the shortest distance point $C_{l1}$. In addition, the start node $23_b$ present at the shortest distance from the present point S is set as the shortest distance point $C_{l2}$ for the path $22_b$ when the intersection between the perpendicular and path is not present.

Figure 16:
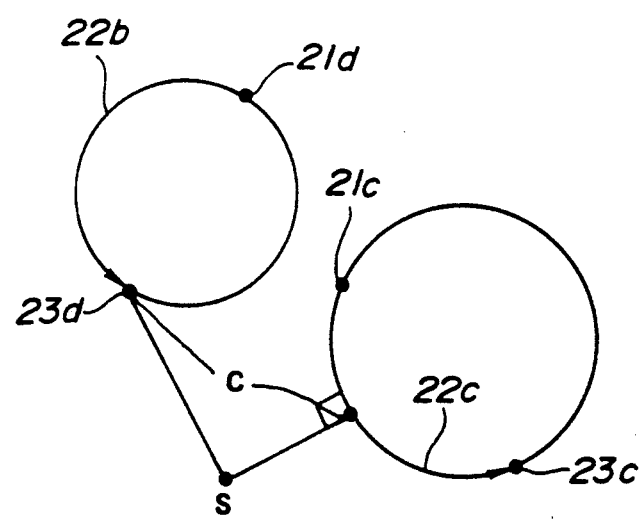

In the case where the route 29 is constituted by curved road segments, as shown in FIG. 16, the perpendicular which is vertical with respect to a tangent line of the path $22_c$ is drawn from the present point S to the path $22_c$. An intersection between the perpendicular and path $22_c$ is set as the shortest distance point C. The end node $23_d$ present at the shortest distance from the present point S and the perpendicular are set as the shortest distance points C, as shown in FIG. 16.

Figure 17:
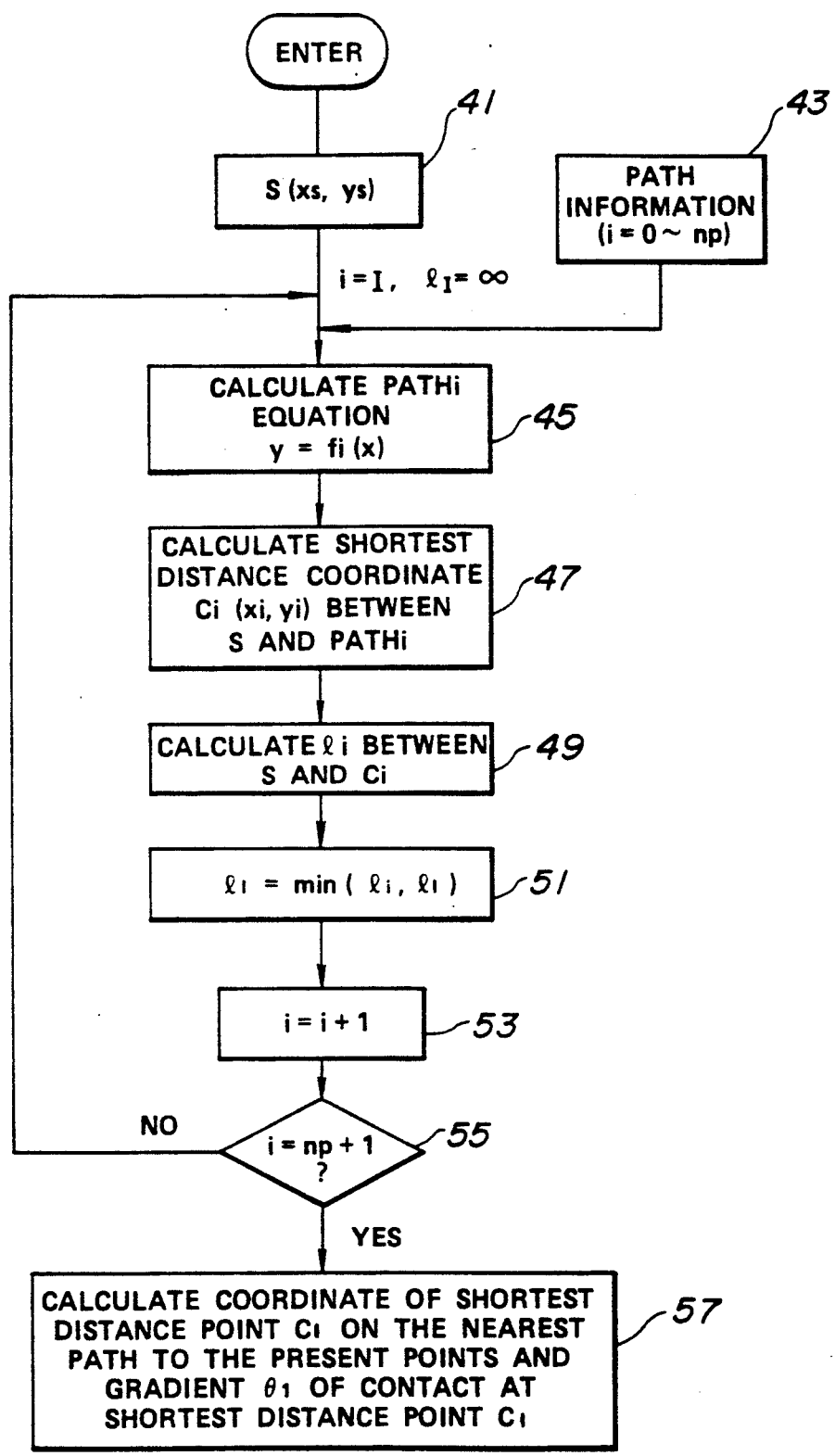
FIG. 17 is an operational flowchart of a control procedure on a setting of a new node.

A setting processing routine of the shortest distance points by means of the run control unit 500 will be described in more details with reference to FIG. 17.

In a step 41, the information on the coordinates ($x_s$, $y_s$) of the present point S is inputted from the detecting unit 200.

In a step 43, the path information on the plurality of paths is sequentially inputted from the data storage block 401.

In a step 45, an equation $y = f_i(x)$ of the path$_i$ (i = 0 to np) is calculated. In a step 47, the shortest distance point $C_i$ ($x_i$, $y_i$) on the path$_i$ present at the shortest distance from the present point S is calculated.

In a step 49, the distance $l_i$ from the present point S to the shortest distance point $C_i$ is calculated in accordance with the following equation (1).

$$l_i = \sqrt{(x_s - x_i)^2 + (y_s - y_i)^2} \qquad (1)$$

The calculations of distances $l_i$ are sequentially executed for the plurality of paths.

In a step 51, supposing that the minimum value derived until the preceding processing has been executed is $l_i$, the presently derived distance $l_I$ is compared with the minimum value $l_i$. That is to say, the step 51 executes the following comparison processing.

$$l_I = \min(l_i, l_I) \qquad (2)$$

In a step 53, the number i is counted up by plus 1. In a step 55, the run control unit 500 determines whether the number of i indicates (np+1), i.e., the calculations of $l_I$ have been executed for all paths.

If i<(np+1), the routine returns to the step 45 to derive $l_I$ for the other paths. If i≧(np+1), the routine goes to a step 57 which determines the coordinates of the shortest distance point $C_I$ and gradient $\theta_I$ of the tangential line at the shortest distance point $C_I$. In this way, the coordinates ($x_I$, $y_I$, $\theta_I$) at the shortest distance point $C_I$ are calculated.

In the same way, the shortest distance point $C_J$ to each of the paths for the final target point E is calculated. The coordinates ($x_J$, $y_J$, $\theta_J$) of the shortest distance point $C_J$ on the corresponding path which serves as the shortest distance between the target point E and each path are calculated.

In a step 35A shown in FIG. 12, updatings of the node data and path data are executed since the new shortest distance point $C_I$ and $C_J$ are set as the new node described above. For example, as will be appreciated from FIG. 15, the path $22_{a1}$ and path $22_{a2}$ are newly set since the shortest distance point $C_{I1}$ is set on the path $22_a$. The new node data on the shortest distance point $C_{I1}$ and path data on the path $22_{a1}$ and path $22_{a2}$ are stored into the data storage block 401. At this time, the path data on the path $22_a$ which is a previous data is erased.

In a step 37A, the determination of the forward direction of the vehicle is executed as will be described below.

Figure 18A:
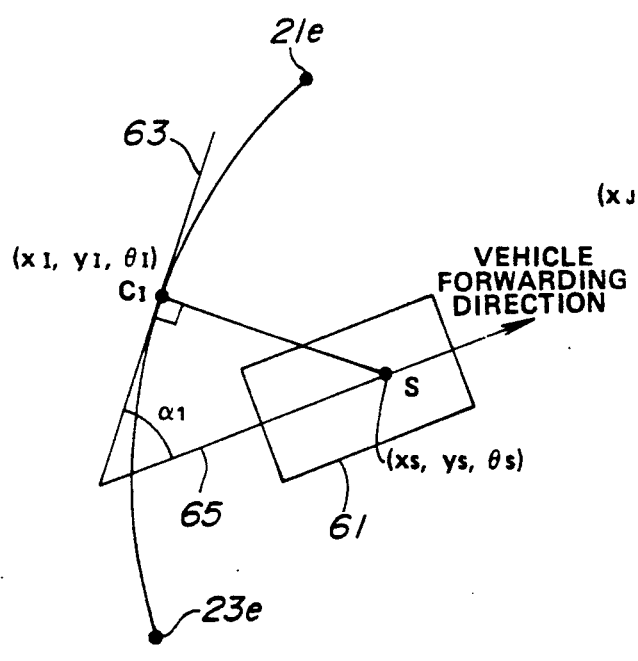
FIGS. 18(A) and 18(B) are explanatory views of determining a travel direction of the vehicle.

With reference to FIG. 18(A), the forward direction of the vehicle at the present point S will be described. An angle $\alpha_1$ formed between a tangential line 63 passing through the shortest distance point $C_1$ and a straight line 65 which is parallel to the elongated direction of the vehicle 61 and which passes through the present point S is derived. The angle $\alpha_1$ is within the following expression.

$$-90° \leq \alpha_1 \leq 90° \qquad (3)$$

If $\alpha_1$ falls in the range described in the equation (3), the direction of the straight line 65 to the start node $21_e$ is set as the forward direction of the vehicle 61.

Figure 18B:
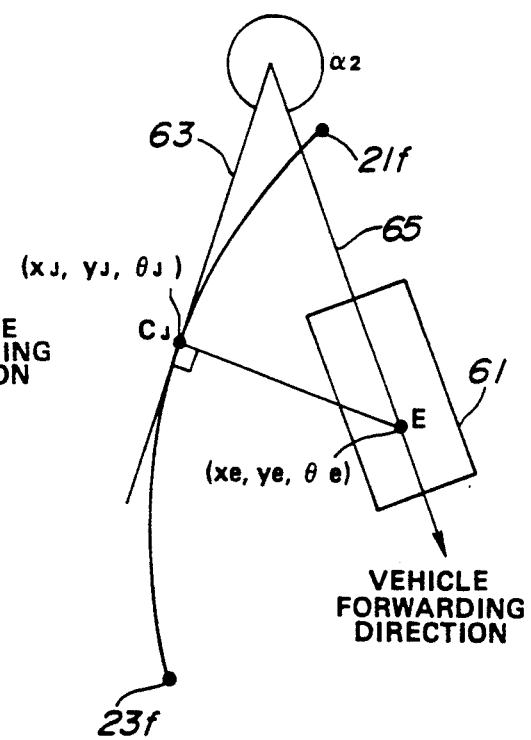

Next, with reference FIG. 18(B) the forward direction of the vehicle at the target point E will be described below. The angle $\alpha$ (alpha)$_2$ formed between the tangential line 63 passing through the shortest distance point $C_J$ and the straight line 65 which passes through the target point E and which is parallel to the elongated direction of the vehicle 61 is derived.

$$-180° \leq \alpha_2 \leq -90° \qquad (4)$$

$$90° \leq \alpha_2 \leq 180° \qquad (5)$$

When the value of $\alpha_2$ falls in the range described in the equation (4) or (5), the direction toward which the vehicle is directed to the start node $21_f$ is determined as the forward direction of the vehicle 61.

A route processing executed in a step 39A will be described below.

Figure 19A:
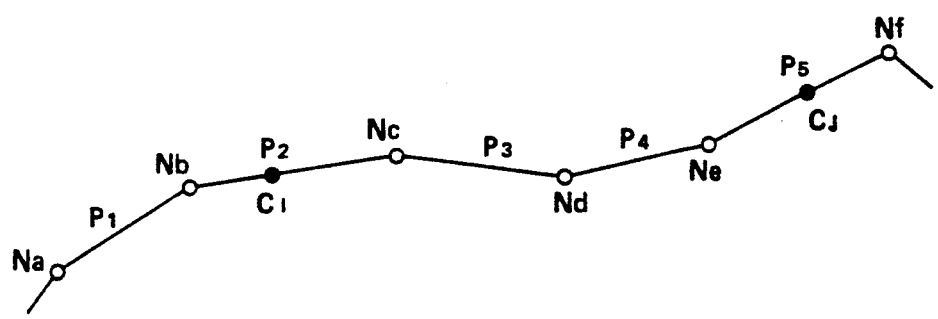
FIGS. 19(A) and 19(B) are explanatory views of a route searching together with the new node setting.
Figure 19B:
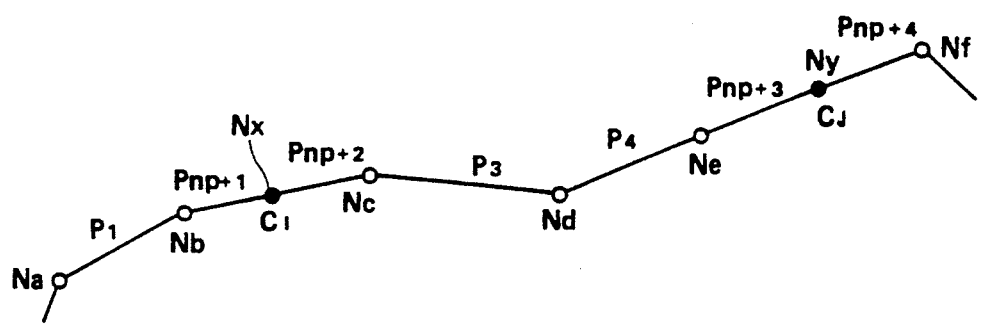

Suppose that, as shown in FIG. 19(A), the nodes $N_a$, $N_b$, $N_c$, ..., $N_f$ and paths $P_1$, $P_2$, $P_3$, $P_4$ and $P_5$ between these nodes are set. A new node set corresponding to the shortest distance point $C_I$ is set as the start node and new node set corresponding to the shortest distance point $C_J$ is set as the end node. As shown in FIG. 19(A), the shortest distance point $C_I$ is set on the path $P_2$ while the shortest distance point $C_J$ is set on the path $P_5$. The new node $N_x$ is set so as to correspond to the shortest distance point $C_I$ as shown in FIG. 19(B). The new node $N_y$ is set so as to correspond to the shortest distance point $C_J$. In addition, along with the set of the node $N_x$, the path $P_2$ is divided into the path $P_{np+1}$ and path $P_{np+2}$. Along with the set of the node $N_y$, the path $P_5$ is divided into the path $P_{np+3}$ and path $P_{np+4}$.

Hence, with the nodes of node $N_c$ to node $N_e$ searched, the nodes in the order of $N_x$, $N_c$, $N_d$, $N_e$, and $N_y$ can be derived as the consequence of the node search. In the same way, as the consequence of the path search, the paths in the order of $P_{np+2}$, $P_3$, $P_4$, and $P_{np+3}$ are derived.

Figure 20:
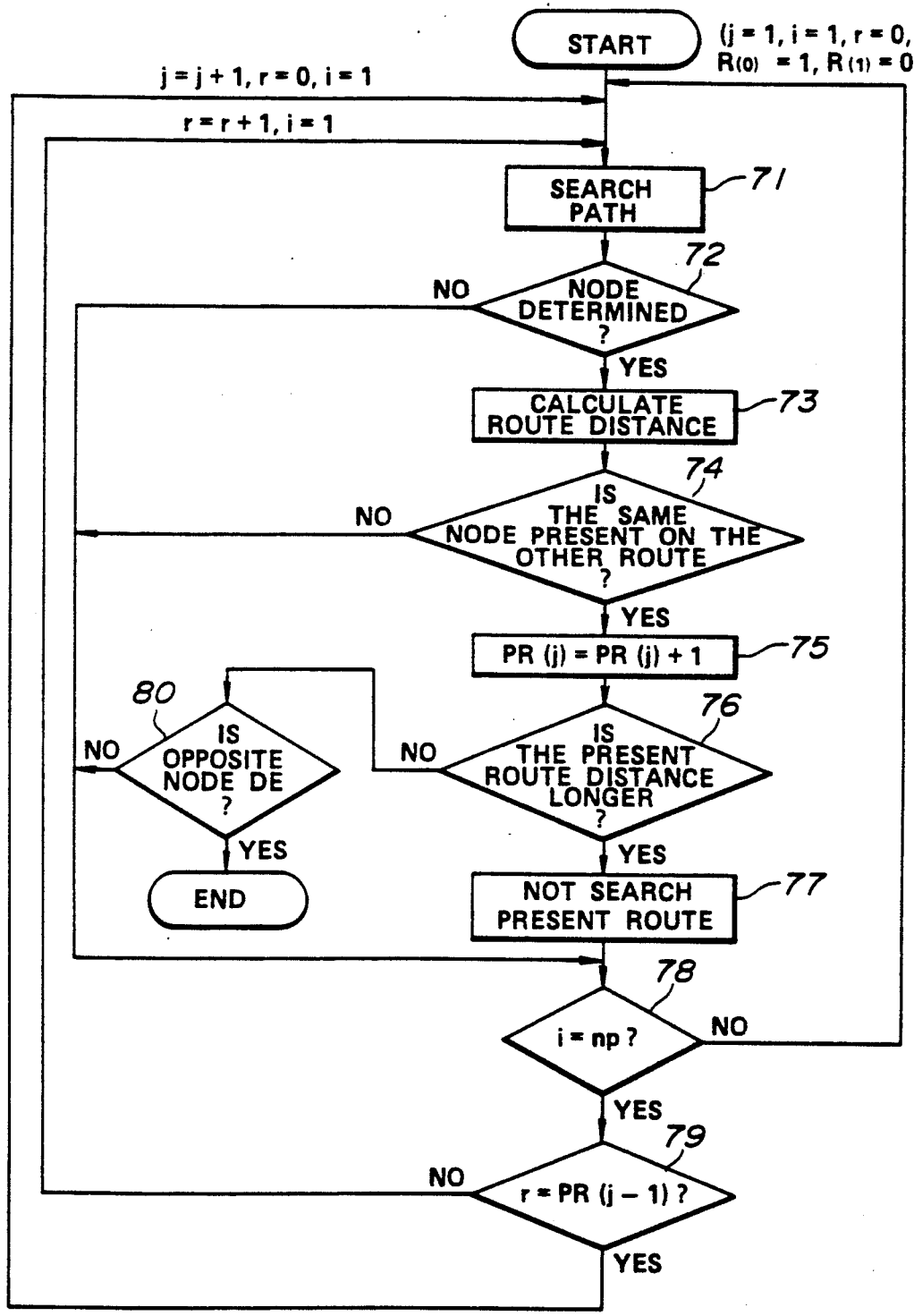
FIG. 20 is an operational flowchart of a general route searching.

FIG. 20 shows a routine on which the route searching in a general running road is executed.

In a step 71, for the plurality of paths the path searching is sequentially executed.

The path searching in the step 71 is illustrated with reference to FIGS. 21(A) and 21(B).

Figure 21A:
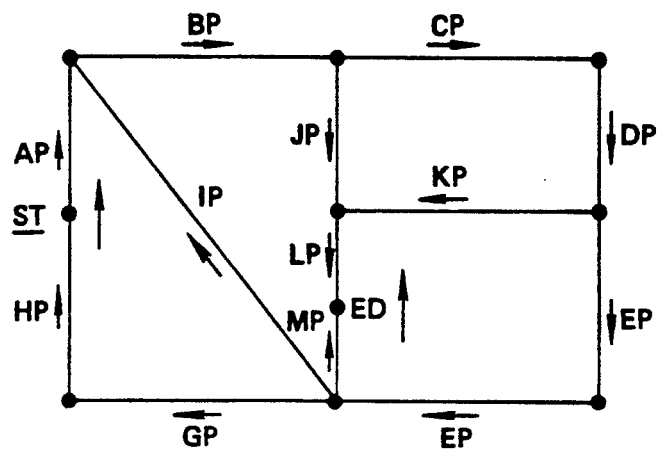
FIGS. 21(A) and 21(B) are explanatory views of the general route searching.

Suppose that a plurality of paths AP, BP, CP, DP, EP, FP, ..., MP are present as shown in FIG. 21(A) and an end node is present in an arrow-marked direction for each path.

Figure 21B:
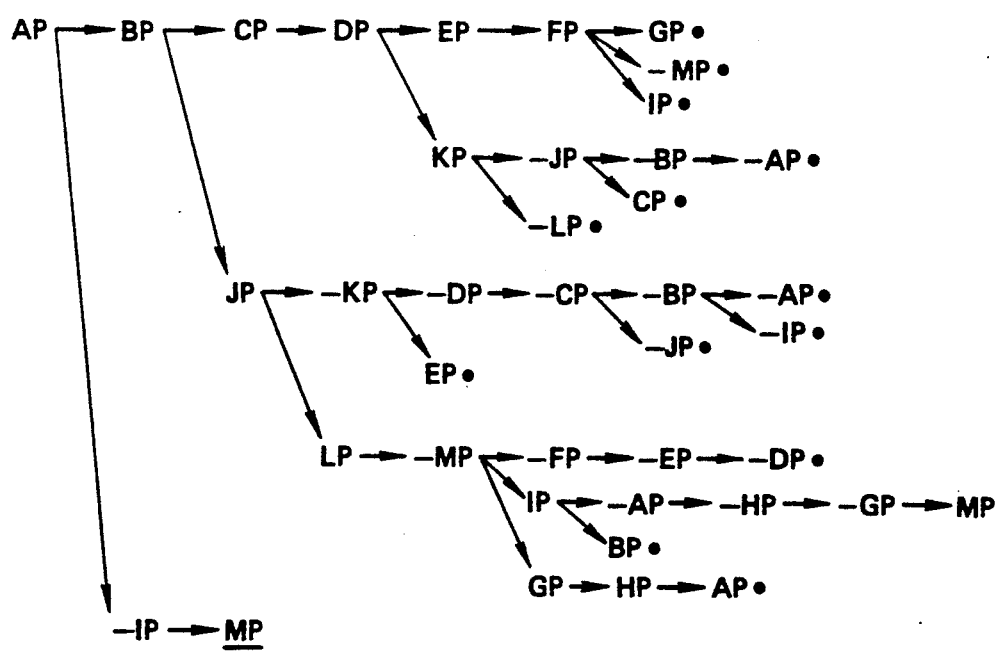

In a case where the route from the present point ST to the target point ED is searched, the search is initiated from the path AP as shown in FIG. 21(B).

The route searching is initiated from the arrow-marked direction at the present point ST and one of the paths which can pass is searched for each path near the present point ST so as to form the route. At this time, the run control block 500 determines whether the path in the route which is searched at the newest search from among the respective routes is present in the other routes. If the path is present in one of the other routes, the block selects one of the routes which is short in accumulated distances derived uptil now and the search of the routes in which the accumulated distances are shorter is not carried out. The search is continued until the path MP appears which is directed in the arrow-marked direction at the target point ED.

In a step 72, the run control block 500 determines whether the searched path is possible to run (node determination) and determines whether the vehicle can go straight through the path, turn to the right, or turn to the left. If the searched path is possible to run, the routine goes to a step 73 in which the accumulated distance of the route from the present point to the final target point is calculated. In a step 74, the block determines whether the searched node is present in the one of the other routes. If it is present, the routine goes to a step 75 to execute the search of the other routes. In a step 76, the block compares the accumulated distance of the route previously searched and accumulated distance of the route presently searched. If the route presently searched is longer than that previously searched, the routine goes to the step 77. Thus, the present route searching is thereafter stopped. In a step 78, the block determines whether all paths have been searched. If not yet searched, the routine returns to the step 71 to continue the search of the route. If all paths have been searched, the routine goes to a step 79 in which the search for the path in the next branching point is executed.

If in the step 76 the accumulated distance of the route which has previously been searched is longer, the routine goes to a step 80 in which the block 500 determines whether the node at a point immediately before the final target point is present in a final path of the route presently searched.

If it is present in the step 80, the route searching is ended.

FIG. 22 shows the detailed contents of the step 72.

In a step 81, the block 500 determines whether the node at the branching point in which two or more paths are branched is the start node on one of the two paths and is the start node on the other of the two nodes.

If the node at the branching point is the start node on both paths, the routine goes to a step 82 in which the following determination processing is executed.

(a). Can the vehicle turn right at a road end of one of the nodes at the branching point and can the vehicle turn left at a road end of the other node at the branching point?

(b). Can the vehicle turn left at the road end of the one node at the branching point and can the vehicle turn right at the road end of the other node at the branching point?

(c). Can the vehicle turn left and right at the road end of the one node at the branching point and can the vehicle turn right and right at the road end of the other node at the branching point?

(d). Cannot the vehicle turn left nor right at the road end of the one node at the branching point and can the vehicle turn right nor right at the road end of the other node at the branching point?

In a case where any one of the above-described determination processings (a) to (d) indicates positive acknowledgement, the routine advances from a step 82 to the step 73 shown in FIG. 20. On the contrary, if all determination processings of (a) to (d) indicate negative acknowledgement, the routine goes to the step 78 shown in FIG. 20.

The routine goes to the step 83 if both of the nodes at the branching point are not the start nodes in the step 81.

In the step 83, the block 500 determines the nodes at the branching point at which two or more paths are branched, i.e., determines whether the node at the one of the paths is the start node and the node at the other path is the end node. As the result of the determination, the routine goes to a step 84 if the determination indicates positive acknowledgement and the routine goes to a step 85 if the determination indicates negative acknowledgement.

In the step 85, the block determines the nodes at the branching point at which two or more paths are branched, i.e., determines whether the node at one of the paths is the end node and the node at the other path is the start node. As the result of determination, the routine goes to a step 86 if the determination indicates positive acknowledgement. If the determination indicates negative acknowledgement, the routine goes to a step 87 if the determination indicates negative acknowledgement.

In a step 87, the block determines the nodes at the branching point at which two or more paths are branched and determines whether the nodes at both paths indicate end nodes. If the determination indicates positive acknowledgement, the routine goes to a step 88.

The determination processings at the steps 84, 86, and 88 are the same as those in the step 82 and the detailed description of the contents thereof will be omitted here.

It is noted that, in FIG. 22, symbol node-st denotes the start node, node-ed denotes the end node, storm denotes the shape of the road and at the start node, and eform denotes the shape of the road end at the end node.

As described above, the route search is executed for all paths so that the route in which the distance from the present point to the final target point becomes minimum is searched. Thus, the vehicle can run toward the final target point by selecting a proper route.

In the second preferred embodiment, the target point is set on the preset route of travel and information on a new target point is generated. Hence, the present point or final target point can arbitrarily be set and an accurate run control with an appropriate search of the route executed can be carried out.

It will be appreciated by those skilled in the art that the foregoing description is made in terms of the preferred embodiments and various changes and modifications may be made without departing from the scope of the present invention which is to be defined by the appended claims.

What is claimed is:

1. An autonomous vehicle comprising:
   a) first means for storing information on each of a plurality of predetermined road segments, a route of travel on which the vehicle is to pass to reach a destination being divided into the plurality of predetermined road segments;
   b) second means for determining a shape for each road segment on the basis of the stored information of the first means;
   c) third means for setting a target running state of the vehicle for each road segment on the basis of the determined shape; and
   d) fourth means for determining a current running route situation, autonomously running the vehicle on the basis of the determined running route situation, and controlling the run of the vehicle on the basis of the set running state,
   wherein the first means includes:

e) fifth means for setting a plurality of target points on the route of travel, each target point defining start and end points of each road segment, and for storing information on each target point thereinto; and f) sixth means for storing information on each path defined as each road segment from its target point to the subsequent target point, and which further includes:

g) seventh means for setting a new target point on one of the paths, the new target point providing a shortest distance from a first point on a route of travel other than the route of travel corresponding to the one path; and h) eighth means for providing information on the newly set target point by the seventh means, the information thereon including the information on a running situation representing a distance of the vehicle from a guide line and an orientation of the vehicle with respect to the guide line at the new target point.

2. An autonomous vehicle as set forth in claim 1, wherein the seventh means includes: ninth means for setting a present point S of the vehicle at which the vehicle is started to run and a final target point E to which the vehicle is finally to reach, each position of the start point S and final target point E defining the first point; tenth means for determining a new first path on one of the paths from the start point S to a first new target point, the new first path being present in the shortest distance from the start point S, eleventh means for determining a new second path on one of the paths from the final target point E to a second new target point, the new second path being present in the shortest distance from the final target point; twelfth means for setting the first and second new target points on the corresponding first and second new paths; and thirteenth means for erasing the information on the paths on which the first and second new paths are superposed and updating the information thereof according to the first and second new paths.

3. An autonomous vehicle as set forth in claim 2, wherein the present point S and final target point E are expressed and inputted as $(x_s, y_s, \theta_s)$ and $(x_e, y_e, \theta_e)$, wherein x and y denote coordinates in a global coordinate system with a position of an origin at which the vehicle is to start and $\theta$ denotes an angle of a global posture of the vehicle in the forward direction of the vehicle ($-180$ degrees $\leq \theta \leq +180$ degrees).

4. An autonomous vehicle as set forth in claim 3, wherein said tenth means determines the new first path by drawing a perpendicular from the start point S to each path or drawing a straight line from the start point S to each target point at which the corresponding path is started in a case where each path as each road segment is constituted by a straight road segment, or by drawing a normal from the start point to each path or drawing a straight line from the start point S to each target point at which the corresponding path is ended in a case where each path as each road segment is constituted by a curved road segment, by deriving each distance from the start point S to a point at which the perpendicular, straight line, or normal is intersected with each path, and by deriving the shortest of the derived distances, one of the points at which the perpendicular, straight line, or normal is intersected which provides the shortest distance from the start point S being determined to be the new first target point.

5. An autonomous vehicle as set forth in claim 4, wherein the eleventh means determines the new second path by drawing a perpendicular from the final target point E to each path or drawing a straight line from the final target point E to each target point at which the corresponding path is started in a case where each path as each road segment is constituted by a straight road segment, or by drawing a normal from the final target point E to each path or drawing a straight line from the final target point E to each target point at which the corresponding path is ended in a case where each path as each road segment is constituted by a curved road segment, by deriving each distance from the final target point E to a point at which the perpendicular, straight line, or normal is intersected with each path, and by deriving the shortest of the derived distances, one of the points at which the perpendicular, straight line, or normal is intersected which provides the shortest distance from the final target point E being determined to be the new second target point.

6. An autonomous vehicle as set forth in claim 5, wherein the eighth means derives a first angle formed between a tangential line passing through the new first target point and a straight line passing through the start point and in parallel to the elongated direction of the vehicle, a second angle formed between a tangential line passing through the new second target point and a straight line passing through the final target point and in parallel to the elongated direction of the vehicle, and searches the information of the paths stored in the sixth means for the plurality of paths from the start point S to the final target point E, the plurality of paths constituting the route of travel to the final target point which provides the shortest distance from the start pont S to the final target point E.

7. An autonomous vehicle comprising:

a) first means for storing information on each of a plurality of predetermined road segments, a route of travel on which the vehicle is to pass to reach a destination being divided into the plurality of predetermined road segments;

b) second means for determining a shape for each road segment on the basis of the stored information of the first means;

c) third means for setting a target running state of the vehicle for each road segment on the basis of the determined shape; and d) fourth means for determining a current running route situation, autonomously running the vehicle on the basis of the determined running route situation, and controlling the run of the vehicle on the basis of the set running state, wherein the first means includes:

e) fifth means for setting a plurality of target points on the route of travel, each targe point defining start and end points of each road segment, and for storing information on each target point thereinto; and f) sixth means for storing information on each path defined as each road segment from its target point to the subsequent target point, and wherein the information of each target point stored in the fifth means includes x and y coordinates of each target point representing an absolute position of each target point on a road map and a name of each target point and the information of each path stored in the sixth means includes a radius of curvature of each path, a length of each path, an angle formed between a tangential line of each target point on the corresponding path and geomagnetic East direction, a road width of each path, the number of traffic lanes on each path, a shape of a start target point of each path, and a shape of an end target point on each path, and classification of one-way traffic or two-way traffic of each path.

8. An autonomous vehicle as set forth in claim 7, wherein the second means determines the shape for each road segment on the basis of the information of each target point and each path stored in the fifth and sixth means.

9. An autonomous vehicle as set forth in claim 8, wherein the third means includes a first sensing unit for detecting and locally deriving a relative position of the vehicle to an object to be sensed present in an end of each road segment and includes seventh means for sequentially producing and outputting a run command PR(j) and a target point command PO(i) on the basis of the information on each target point and each path stored in the fifth and sixth means, said seventh means outputting the target point command PO(i) (i=0, 1, 2, - - - , n max) and the run command PR(j) (j=1, 2, - - - , o max) to the fourth means in paired couples wherein i=j, and wherein the fourth means controls running of the vehicle through a vehicular component including a power driving source, a power transmission, and brake mechanism of the vehicle in response to each of the coupled run commands and target point commands issued from the seventh means.

10. An autonomous vehicle as set forth in claim 9, wherein each run command PR(j) includes information identifying a target point command to be paired therewith, a distance of a road center line between a corresponding target point and subsequent target point, a target vehicle speed during the run on each path, a target steering angle at each target point, a selection of a white line to be sensed by the first sensing unit, a distance of the vehicle to the white line to be maintained by the vehicle, and a local target vehicle posture and each target point command PO(i) includes items of a global target position of the vehicle at each target point in the absolute coordinate system $(x_g, y_g, 0)$, a local target position of the vehicle at each target point $(x_l, x_r, 0_d)$, a target vehicle speed $V_{po}$ at each target point, and a target steering angle $S_{po}$ at each target point.

11. An autonomous vehicle as set forth in claim 10, wherein the third means previously sets ten kinds of command rules according to the shape determined by the second means, a first rule being such that one of the target point commands PO(i+1) is set at the same point as the target point N, the target vehicle speed $V_{po}$ thereof being set to a relatively lower speed and the target steering angle $S_{po}$ being set at a constant angle, so that the fourth means controls the run of the vehicle so that the vehicle is gradually steered, decreasing the speed at a position of the corresponding target point through which the vehicle enters a curved road segment, a second rule being such that one of the target point commands PO(i+1) is set at a position in a forward direction with respect to the point of the corresponding target point N, at that position, the target vehicle speed $V_{po}$ being set at a relatively high speed and the target steering angle $S_{po}$ being set to zero, and one of the run command PR(j+1) is set in which the run target vehicle speed $V_{pr}$ is set to a relatively low speed, the run target steering angle $S_{pr}$ is set at a constant angle, and by selection of $Q_o$ is set to right or left, so that the fourth means accelerates the vehicle at a last half of a curved road segment, gradually returning the vehicle steering angle to an original angle, a third rule being such that one of the target point commands PO (i) is set at a position in front of the corresponding target point N and thereby a lane distance d in the coupled run command PR(j+1) is corrected, a fourth rule being such that one of the target point commands PO(i+1) is set at a position before the corresponding target point N which is a branching point, the target vehicle speed $V_{po}$ being set to a relatively low speed and target steering angle being set to a constant angle, so that the fourth means gradually steers the vehicle, decreasing the vehicle speed at the position before the vehicle enters the branching point, a fifth rule being such that one of the target point command PO(i+1) is set at a position in the forward direction with respect to the target point N which is the branching point, the target vehicle speed $V_{po}$ of the target point command PO(i+1) being set at a relatively high speed, the target steering angle $S_{po}$ being set to zero, the target vehicle speed $V_{pr}$ of the run command PR(j+1) being set to a relatively low speed, and the target steering angle $S_{pr}$ being set to a constant angle, so that the fourth means accelerates the vehicle after the passage of the branching point, gradually returning the steering angle to an original angle, a sixth rule being such that one of the target point commands PO(i) is set at a position in the forward direction with respect to the target point N and the lane distance d in the run command PR(j+1) is corrected, a seventh rule being such that one of the target point commands PO (i+1) is set at a position before the target point N which is the intersection, the target vehicle speed $V_{po}$ of the target point command PO (i+1) being set at a relatively low speed, so that the fourth means decreases the vehicle speed at the position before the intersection, an eighth rule being such that one of the target point commands PO(i) is set at a position in the forward direction with respect to the corresponding target point N which is the intersection, the target vehicle speed $V_{po}$ of the target point command PO(i+1) being set to a relatively high speed, the run target vehicle speed of the run command PR (j+1) being set to a relatively low speed, the selection $Q_o$ thereof being set to "nothing", so that the fourth means controls the run of the vehicle so that the vehicle passes the intersection at the low speed and thereafter is accelerated after the passage of the intersection since no information on the white line is obtained, a ninth rule being such that the lane distance in the run command PR(j+1) is corrected along with one of the target point commands PO(i) set at a position before the corresponding target point N which is the intersection, the selection $Q_o$ of the white line being set to "right" or "left", so that the fourth means controls the run of the vehicle, collecting information on the white line after the passage of the intersection, and tenth rule being such that one of the target point commands PO(i+1) is set on the same point as the target point N, at that point, the target vehicle speed $V_{po}$ thereof being set to a relatively low speed, the target steering angle $S_{po}$ of thereof being set to zero, the run target vehicle speed $V_{pr}$ of the run command PR(j+1) being set at a constant angle, so that the fourth means controls the run of the vehicle so that the vehicle runs of the curved road at the low speed and the steering angle of the vehicle is gradually returned to the original angle when passing through a last half of the curved road.

12. An automomous vehicle as set forth in claim 9, wherein the first sensing unit includes two sets of video cameras located on a front end of the vehicle with a space apart from each other and wherein the third means includes a second sensing unit for detecting and globally deriving an absolute position of the vehicle, the second sensing unit including wheel speed sensors and gyroscope.

13. An autonomous vehicle, comprising:
 a) first means for storing information on each of a plurality of predetermined road segments, a route of travel on which the vehicle is to pass to reach a destination being divided into the plurality of predetermined road segments, wherein said information includes data formatted to identify shapes of the plurality of road segments;
 b) second means for determining a shape for each road segment on the basis of the stored information of the first means;
 c) third means for setting before running of the vehicle control rules for the vehicle for each road segment shape on the basis of the determined shape; and
 d) fourth means for determining a current running route situation, autonomously running the vehicle on the basis of the determined running route situation, and controlling the run of the vehicle on the basis of the previously set running state,
 wherein said fourth means includes sensing means for spontaneously obtaining information identifying a condition of a travel route of the vehicle, whereby said fourth means runs the vehicle autonomously based on the sensed travel route condition and the set running state, and
 said sensing means comprises camera means and an image processing unit, said fourth means thus autonomously running the vehicle in accordance with an image of the travel route of the vehicle and the set running state,
 wherein said camera means comprises a pair of cameras for obtaining a stereo perspective image of the travel route of the vehicle and said image processing unit including means for transforming the perspective image to a plane image.

14. A method for autonomously running an autonomous vehicle, comprising the steps of:
 a) storing shape information describing each of a plurality of predetermined road segments, a route of travel on which the vehicle is to pass to reach a destination being divided into the plurality of predetermined road segments;
 b) determining a shape for each road segment on the basis of the stored shape information in the step (a);
 c) before running of the vehicle, setting control rules for the vehicle for each road segment shape on the basis of the determined shape; and
 d) controlling running of the vehicle on the basis of the previously set running state, wherein said step of storing information comprises using a pair of cameras for obtaining a stereo perspective image of at least one of the road segments of the route of travel of the vehicle, and processing the obtained stereo perspective image to provide data representing said shape information for storage.

15. A method as recited in claim 14, wherein said step of processing the obtained stereo perspective image to provide data comprises formatting the data to include start point data, radius of curvature data, path length data, end point data, and tangential direction data for the start point and the end point of the at least one road segment, and storing the formatted data as said shape information.

16. An autonomous vehicle, comprising:
 a) first means for storing information on each of a plurality of predetermined road segments, a route of travel on which the vehicle is to pass to reach a destination being divided into the plurality of predetermined road segments, wherein said information includes data formatted to identify shapes of the plurality of road segments;
 b) second means for determining a shape for each road segment on the basis of the stored information of the first means;
 c) third means for setting before running of the vehicle control rules for the vehicle for each road segment shape on the basis of the determined shape; and
 d) fourth means for determining a current running route situation, autonomously running the vehicle on the basis of the determined running route situation, and controlling the run of the vehicle on the basis of the previously set running state, wherein said fourth means determines the current running route situation responsive only to image data descriptive of road features, independently of road markers.

* * * * *